March 19, 1968 J. W. RUNDT ET AL 3,373,584
MEANS FOR IDENTIFYING DEFECTIVE WIRE AND FOR
REJECTING ARTICLES MADE THEREFROM
Original Filed Nov. 2, 1960 5 Sheets-Sheet 1
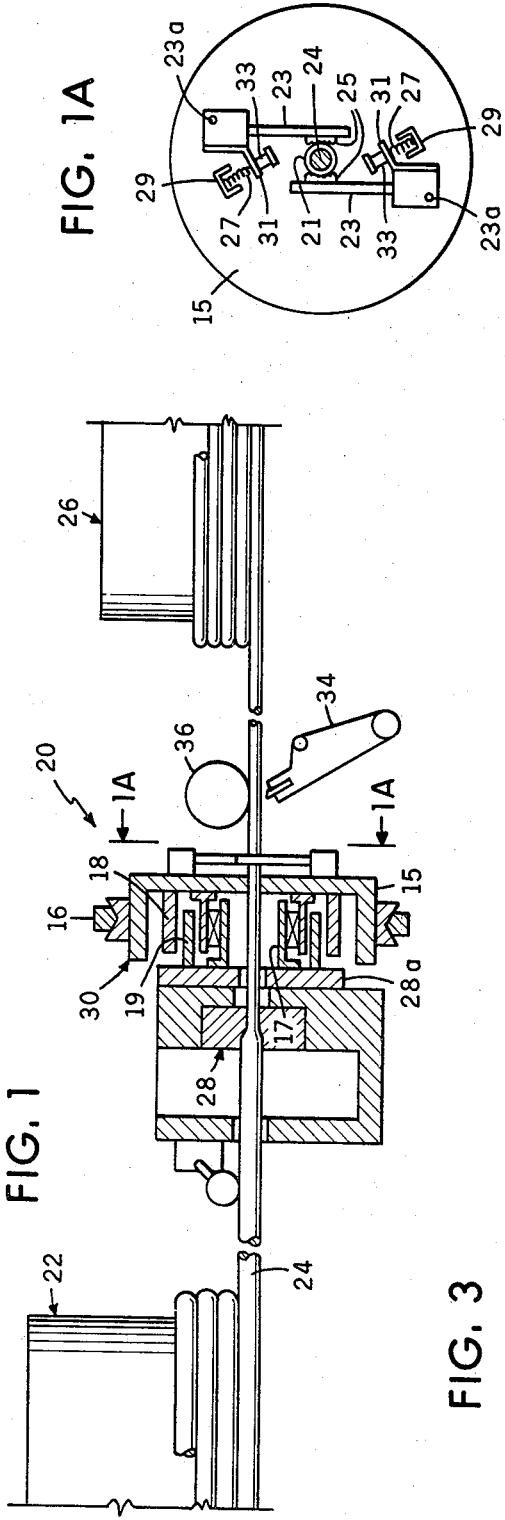
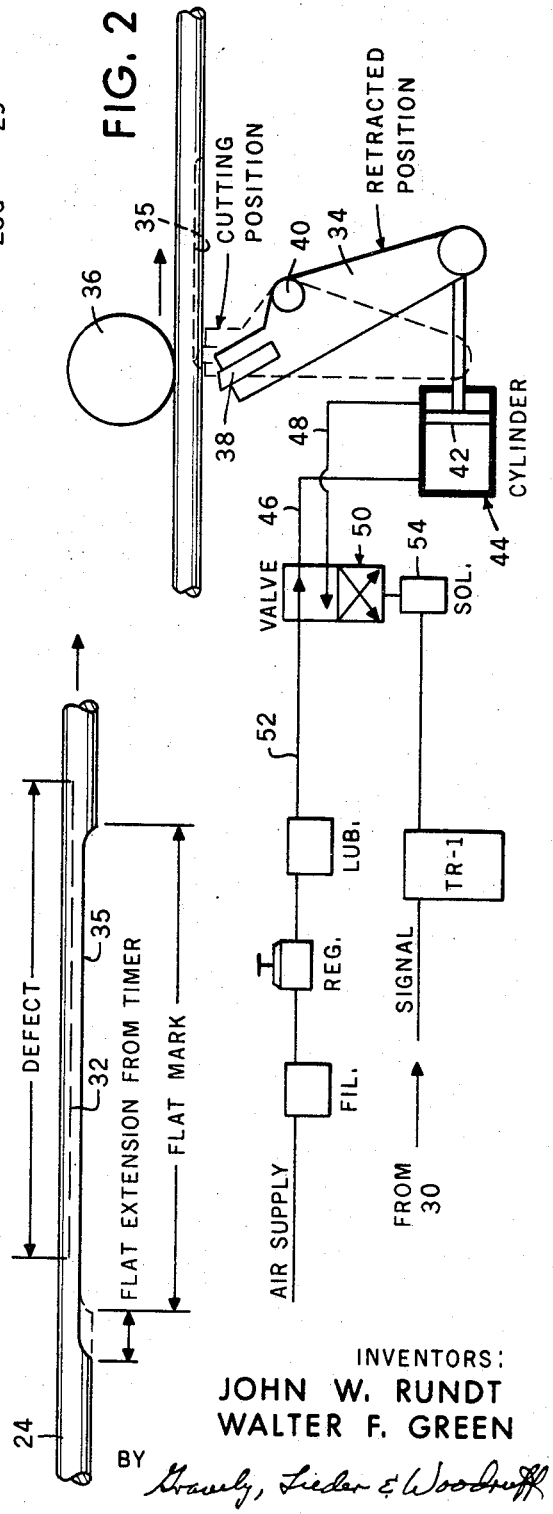
INVENTORS:
JOHN W. RUNDT
WALTER F. GREEN
BY *Gravely, Lieder & Woodruff*
ATTORNEYS

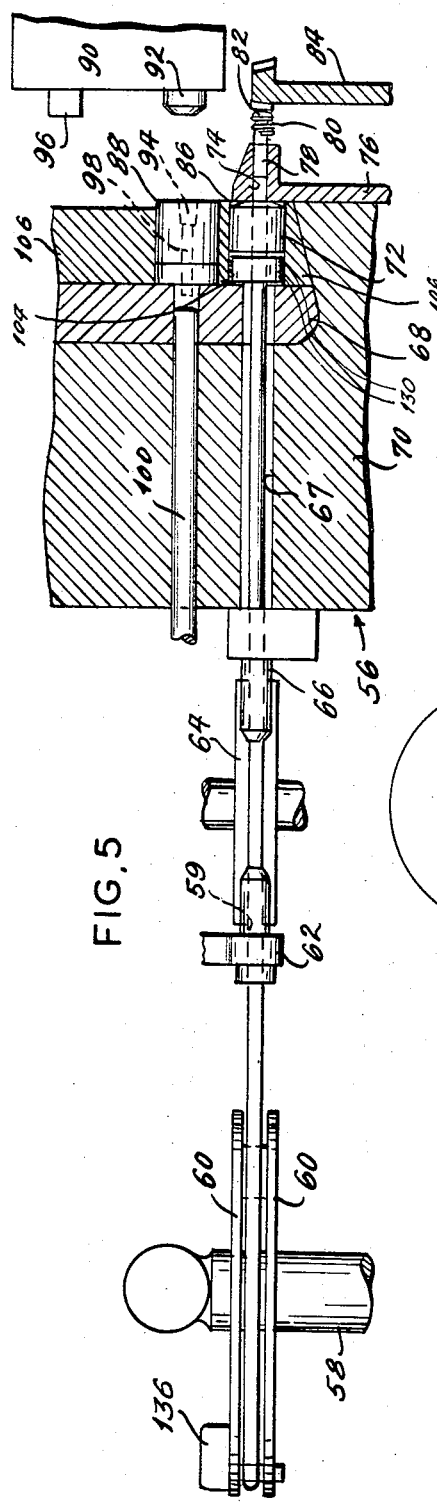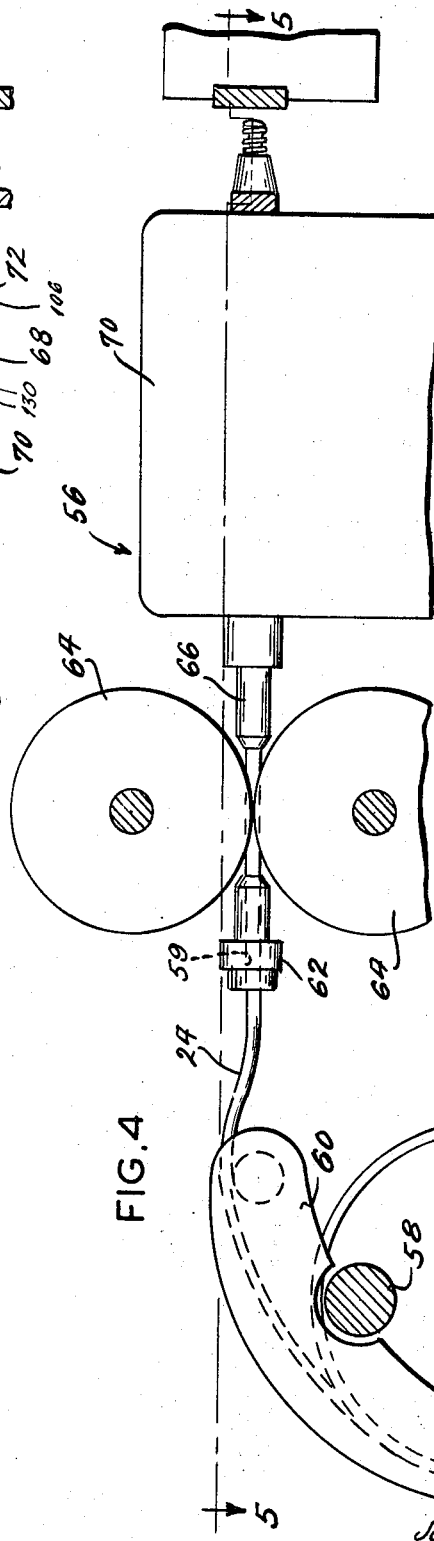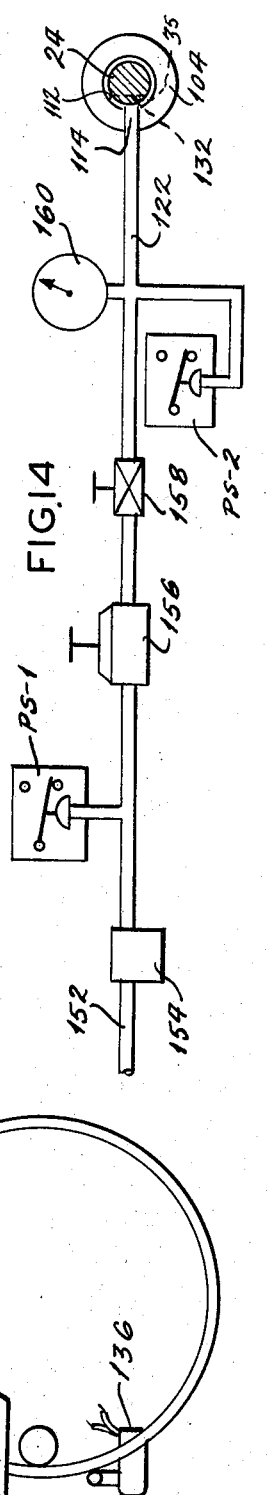

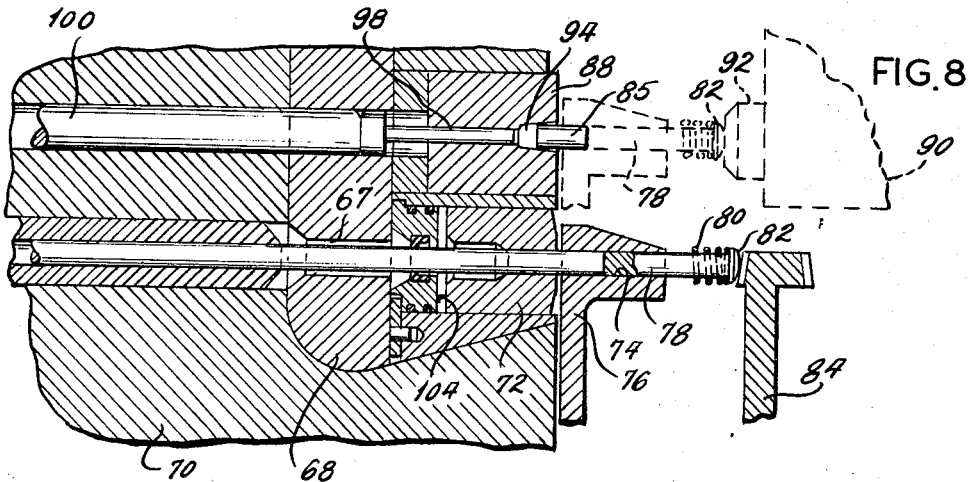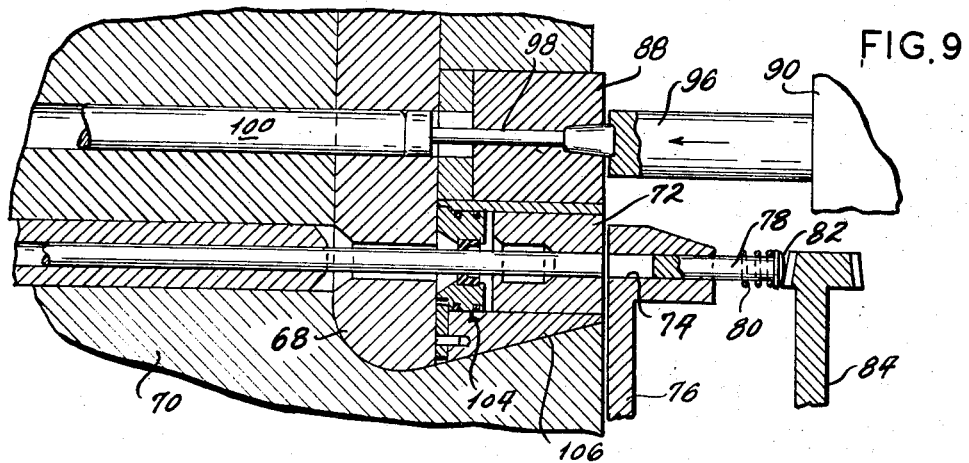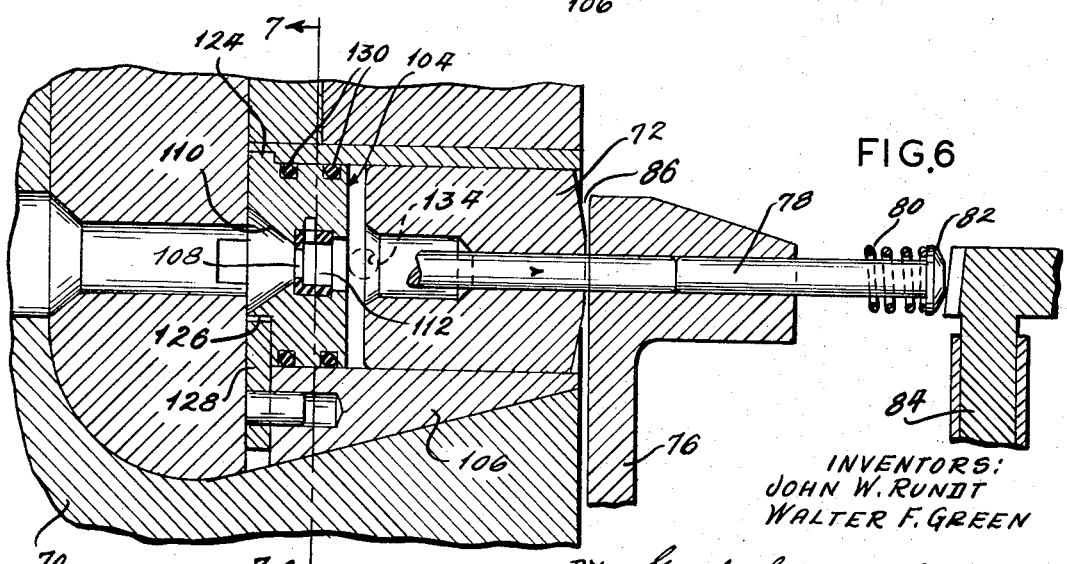

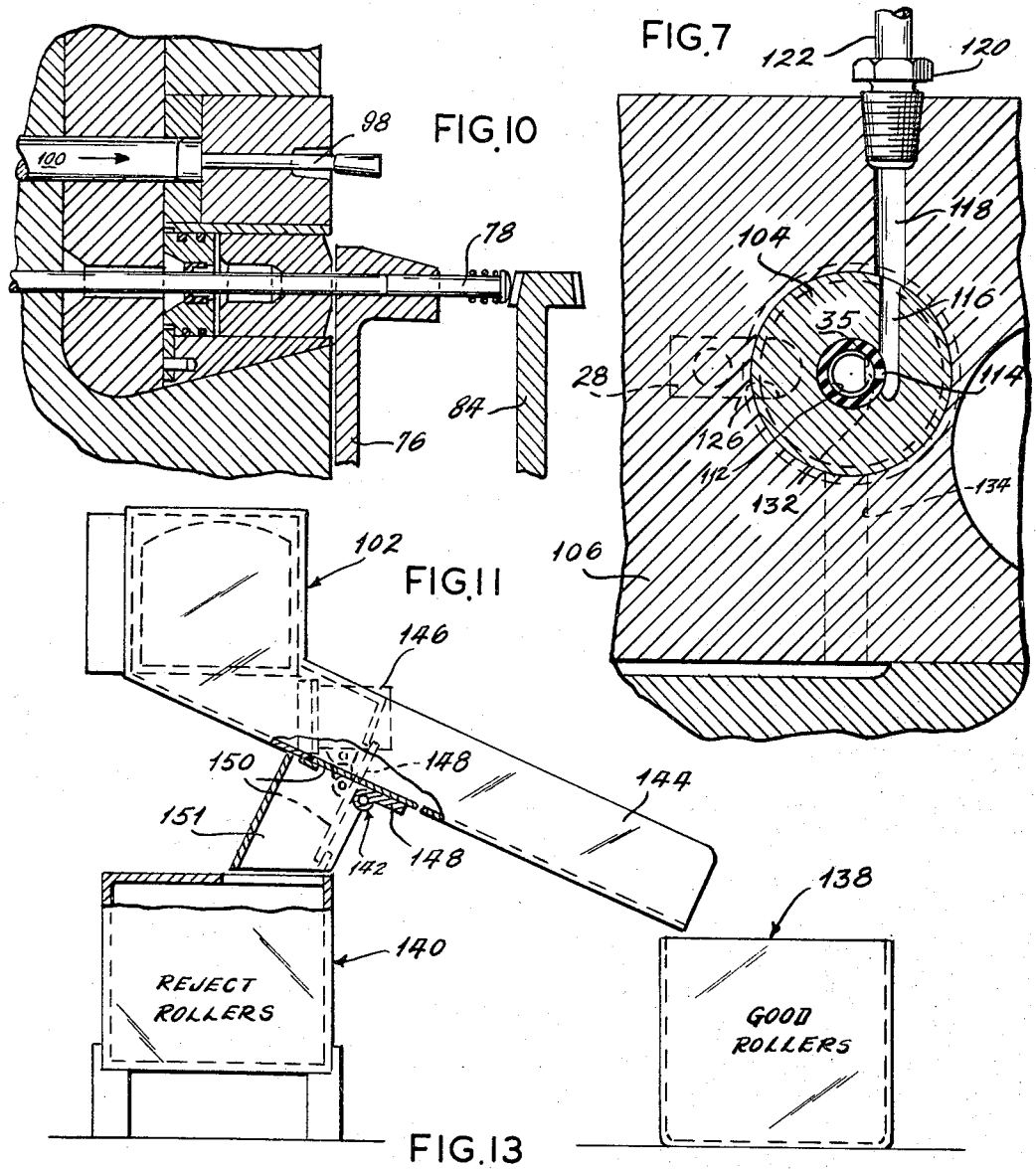

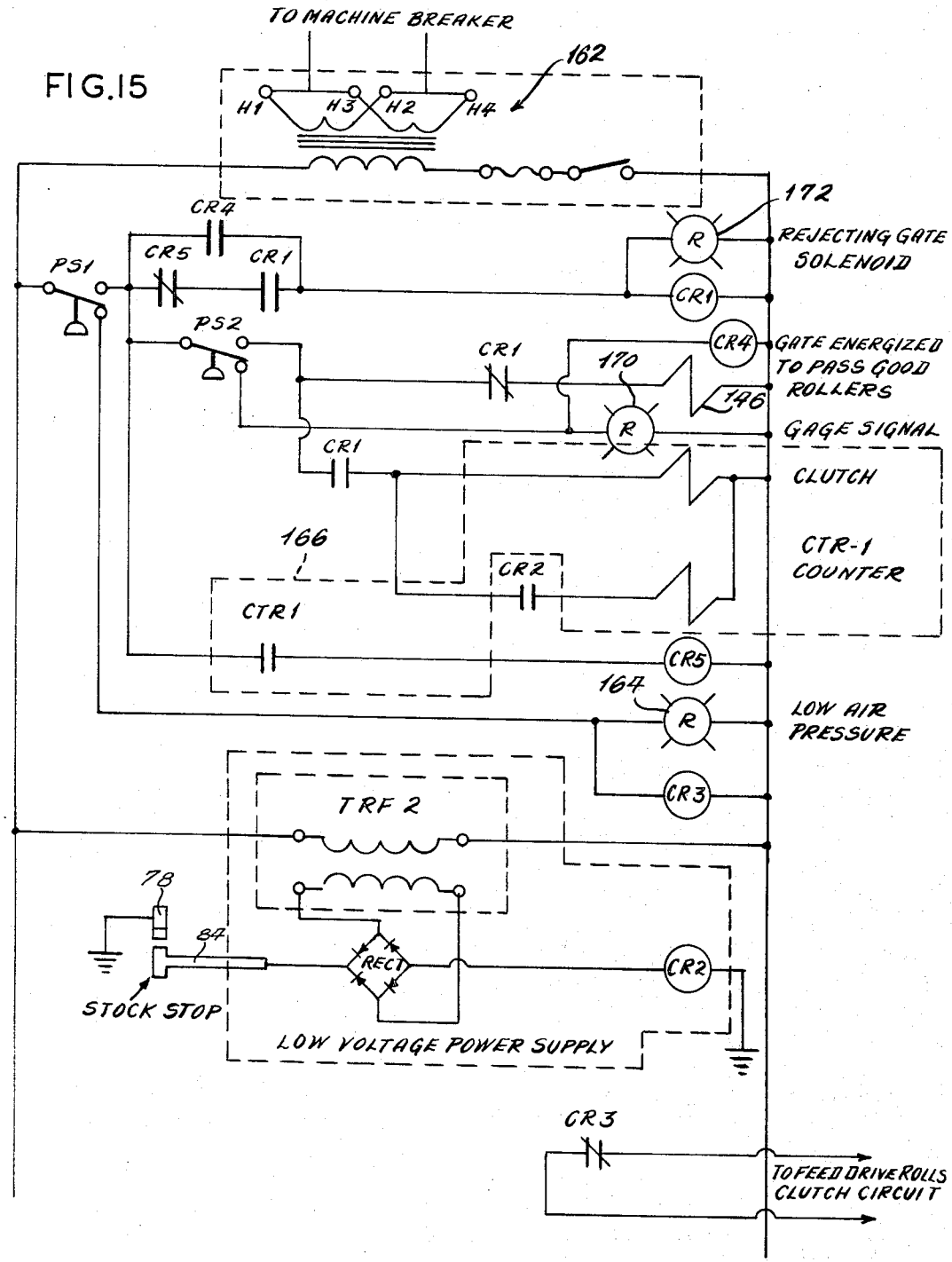

United States Patent Office 3,373,584
Patented Mar. 19, 1968

3,373,584
MEANS FOR IDENTIFYING DEFECTIVE WIRE AND FOR REJECTING ARTICLES MADE THEREFROM
John W. Rundt and Walter F. Green, Canton, Ohio, assignors to The Timken Roller Bearing Company, Canton, Ohio, a corporation of Ohio
Continuation of application Ser. No. 66,830, Nov. 2, 1960. This application July 15, 1964, Ser. No. 382,841
2 Claims. (Cl. 72—10)

The present invention relates generally to devices for locating defects in wire and for marking the wire in the locale of the defects and also to means for rejecting articles made from the defective wire.

This application is a continuation of co-pending application Ser. No. 66,830, now abandoned, filed Nov. 2, 1960, by John W. Rundt and Walter F. Green.

Many devices have been constructed in the past for locating defects in products such as wire and the like to improve the quality of articles manufactured therefrom. So far as known, however, none of the devices constructed heretofore have included means for identifying the defective portions of the product or wire by removing slices therefrom in the locale of the defective portions, and furthermore no one heretofore has devised means which respond to said slices for automatically separating parts made from the defective product from parts made from the nondefective product.

It is therefore a principal object of the present invention to provide means for automatically identifying and separating defective members from nondefective members during the manufacture thereof.

Another principal object is to provide means responsive to a defect identifying marking on a product for separating parts made from the defective product from parts made from the nondefective product.

Another object is to improve the quality of parts made from wire and other drawn material.

Another object is to separate articles of acceptable quality from articles of unacceptable quality.

Another object is to employ air pressure means to classify articles.

Another object is to improve the quality of articles such as rollers for bearing assemblies and the like.

Yet another object is to provide means for classifying articles according to quality which means are adaptable to be used to classify many different sizes and shapes of articles made from wire.

Briefly, the present device comprises means responsive to defects such as longitudinal cracks or the like in a product such as wire, and means controlled by said last named means for making a slice in the product in the locale of all of said defects. The present invention also includes means adapted to be employed in conjunction with a machine for forming individual parts from wire, said means including means responsive to the slices in the wire and other means controlled by said last named means for separating the parts made from defective wire from the rest of the parts.

These and other objects and advantages of the present invention will become apparent after considering the following detailed description of a particular embodiment of the invention in conjunction with the acompanying drawings, wherein:

FIG. 1 is a side elevational vew, partly in section, of a wire drawing machine including a device for identifying and marking defective wire during the drawing thereof;

FIG. 1A is an end view taken at line 1A—1A in FIG. 1 showing the probes for locating defects in the drawn wire.

FIG. 2 is a schematic view of the wire marking device and controls therefor of FIG. 1, said device being shown in inoperative position in solid outline, and in operative position in phantom outline;

FIG. 3 is an enlarged fragmentary view of a length of defective wire with an identifying marking formed therein by the device of FIGS. 1 and 2;

FIG. 4 is a fragmentary side elevational view of a machine for forming individual parts from wire;

FIG. 5 is a cross sectional view taken on line 5—5 of FIG. 4;

FIG. 6 is an enlarged fragmentary cross-sectional view of the wire feed portion of the machine of FIG. 5, the device being shown in wire receiving position;

FIG. 7 is a cross-sectional view taken on line 7—7 of FIG. 6;

FIG. 8 is a cross-sectional view similar to FIG. 6 illustrating in phantom outline a later operating position of the machine;

FIGS. 9 and 10 are cross-sectional views similar to FIGS. 6 and 8 illustrating still other operating positions thereof;

FIG. 11 is a side view, partly in section, showing the discharge portion of the machine of FIGS. 4 and 5;

FIG. 12 is an enlarged perspective view of a tapered bearing roller formed by the machine of FIGS. 4 and 5;

FIG. 13 is a cross-sectional view taken through the center of the roller of FIG. 12;

FIG. 14 is a simplified schematic view of an air pressure system employed to identify defective wire entering the machine of FIG. 4; and FIG. 15 is a schematic wiring diagram illustrating a typical circuit for the subject device.

Referring to the drawings by reference numerals, the number 20 in FIG. 1 refers generally to a wire drawing machine. The machine 20 has an input spool 22 that carries a coil of wire 24 which is to be reduced in diameter, and an outlet or rewind spool 26 which winds up the reduced diameter wire after being drawn. The wire 24 travels from the spool 22 to the spool 26 through a reducing die assembly 28 which is of a known construction.

After the wire 24 has passed through the die assembly 28, it passes through an electromagnetic inspection device 30 and TR–1 also of known construction, which inspects the wire for defects. The more common types of defects which are detected are surface cracks or imperfections which extend substantially longitudinally of the wire. Such a defect is illustrated by the dash line 32 in FIG. 3.

Referring now in particular to FIGS. 1 and 1A, it can be seen that the electro-magnetic inspection device includes a rotary signal pickup assembly 30 and the appropriate electronic circuit shown schematically at TR–1 in FIG. 2. The assembly 30 includes a rotor 15 driven from a suitable power source by a belt 16 and supported by a suitable bearing carrier sleeve 17 from the plate 28a on the die assembly 28. There is a transformer carried between the plate 28a and the rotor 15 consisting of the primary coil 18 carried by the rotor and the secondary coil 19 carried by the stationary plate 28a on the die assembly. The electrical wiring circuit is not shown as this is of known arrangement. In FIG. 1A there is shown the face of the rotor 15 suitably apertured at 21 to allow the drawn wire 24 to pass therethrough. The inspection is performed by a pair of pivoted arms 23 having probe coils 25 in the outer ends where they may contact the surface of the wire 24 and sweep the periphery of the wire as the rotor 15 carries the arms in a circular path. The arms are pivoted at 23a such that during rotation centrifugal force will cause the probe wires 25 to move in onto the wire 24 against the force of springs 27 carried in suitable housings 29. The springs act on levers 31 which are connected to the pivoted ends of the arms 23. As long as rotation is maintained the levers 31 will compress the springs, but when rotation stops the springs 27 take over and move the probes 25 out of the way as determined by the location of the stops 33 against which the levers 31 are pushed by the springs 27. This clears the wire aperture 21 in the face of the rotor 15. Electrical signals are picked up by the probe contact wires 25 during the rotation and when a defect in the wire is present the signal is coupled to an electronic detector TR-1, as indicated schematically in FIG. 2, through the transformer coils 18 and 19. Therefore, a defect such as the crack 32 of FIG. 3 will energize the proper circuit to cause a marking tool 34 to move into engagement with one side of the wire 24 and make a longitudinal cut or slice 35 therein as the defective portion of the wire moves past the probe wires 25 carried by the rotor 15 of the inspection device 30.

The marking tool 34 is pivotally mounted adjacent one side of the wire 24 and is movable between an inoperative position as shown in solid outline in FIG. 2, and an operative position engaging the wire 24 as shown in phantom outline. A backing roller 36 is mounted on the opposite side of the wire from the marking tool 34 to support the wire during a marking or cutting operation.

In the embodiment shown in FIG. 2, the marking tool 34 includes a blade 38 which engages a side of the wire whenever defective portions are passing. The tool 34 is pivotally mounted on a shaft 40, and is connected to a piston and rod assembly 42 of an air or fluid cylinder assembly 44. The opposite ends of the cylinder 44 are connected by conduits 46 and 48 to a valve 50 which is connected to an air or fluid pressure supply source by a conduit 52. The valve 50 is of a known construction used to reverse the direction of applied force and is controlled by a solenoid unit 54 which is energized and deenergized by signals generated in the electromagnetic detection device 30 and TR-1 in response to the defects. It is also contemplated to provide suitable timed circuit means in the form of a solenoid hold circuit to maintain the tool 34 engaged with the work beyond the end of each defect in order to be sure that the slices 35 extend at least to the ends and preferably a little beyond the ends of the defects. This is done to insure that in later operations all parts formed from defective wire are rejected.

After the wire 24 has passed through the die assembly 28, the defect detector 30 and TR-1, and the station for the marking tool 34, it is wound into a coil on the spool 26 for later use. At this stage the wire has flats or cut outs 35 identifying the defective portions, and all of the flats or cut outs 35 are located on the same side of the wire.

Referring to FIGS. 4 and 5, there is shown a portion of a cold heading machine 56 wherein a plurality of parts, such as bearing rollers, are made from the wire 24. A coil of the wire 24 is positioned on a support structure 58, and one end of the wire is directed between a pair of spaced guide plates 60 which guide it to the feed portion of the heading machine 56. The wire enters the heading machine by first passing through an aperture 59 in a fixed guide member 62 and thereafter moves between a pair of pressure loaded friction drive feed rolls 64 which are grooved to grip and propel the wire into the heading machine 56. The feed rolls 64 are rotated an amount during each machine feed cycle to advance the wire slightly more than the length necessary to form one roller, such as the tapered roller 65 (FIGS. 12 and 13). From the rolls 64, the wire passes through a guide tube 66, through a passage 67 in a bolster plate 68 and in a support member 70 therefor and then through a ring unit 104 which will be described later. Next the wire passes through a cut off die 72. When the feed rolls 64 turn, the wire is propelled through the cut off die 72 and into an aperture 74 in a shear blade 76 until it contacts a movable punch member or pin 78. The punch member 78 carries a spring 80, the purpose of which will be described later. As the wire advances into the machine during a wire feed operation, it drives the punch 78 back until its head portion 82 is stopped by a feed stop member 84. The stop 84 is positioned to stop the advance of the incoming wire while at the same time measuring the correct length of wire necessary to form a slug 85 (FIG. 8) of desired length for making a roller 65. The feed rolls 64 as previously noted, are adjusted to provide a slight extra advancing force on the wire to assure that a full length slug 85 is always fed in. This extra force may produce some slippage between the feed rolls 64 and the wire.

The mechanism of the machine 56 now moves the shear blade 76 laterally relative to the cut off die 72 and shears the wire at the cut off plane 86 (FIG. 6). At the same time the shear blade 76 carries the cut off slug 85 in a lateral direction into alignment with a taper die 88 (FIGS. 8 and 9). The machine 56 also includes a two station ram assembly 90, which stations are alternately operated to effect formation of tapered rollers 65 from the cylindrical slugs 85. One of the ram stations includes a punch member 92 which strikes the head end 82 of the pin 78 (FIG. 8) to drive the slugs 85 into a tapered die socket 94 in the die member 88. The slugs 85 before being formed into tapered rollers are cylindrical and have diameters approximately the same as the diameter of the small end of the die socket 94 but smaller than the diameter of the large end of the die socket 94. Furthermore, each time the punch 92 pushes a slug 85 into the die socket 94 it does so with sufficient force to partially upset the slug and to impart a part of the required taper thereto. As the ram 90 recedes the spring 80 retracts the pin 78 to keep it clear of the cut off plane 86, and the machine mechanism shifts the ram assembly laterally relative to the die member 88 to a second ramming position. In the second ramming position a head die 96 (FIG. 9) is in alignment with the tapered die socket 94. Also, at the same time that the ram is moving to the second ramming position the shear blade 76 returns to a position in alignment with the cut off die 72 in readiness to receive another length of wire for another slug. Thereafter, the second stroke of the ram 90 takes place as illustrated in FIG. 9 to complete the upsetting and forming of the tapered roller 65 and to apply a desired shape to the end thereof, such as the recessed end portion 97 shown in FIGS. 12 and 13.

When the ram 90 again recedes, a knock-out pin 98 positioned in an orifice in the tapered die 88 is tapped by a push rod 100 under control of the machine 56 to eject the roller into a chute assembly 102 (FIG. 11). The chute 102 will be described more fully hereinafter.

A ring unit 104 is installed in a mounting member 106 behind the cut off die member 72 (FIG. 6). The ring unit 104 has an aperture 108 therethrough which is in alignment with the passage in the die member 72, and the incoming wire 24 passes through the aperture 108 before it passes through the cut off die 72. The entrance side of the ring unit 104 is tapered at 110 in order to guide the incoming wire through the aperture 108, and the internal diameter of the ring unit 104 on the output side of the aperture 108 at 112 is slightly greater than the diameter of the aperture 108. In an actual machine employing the subject device, the aperture 108 was selected to be approximately .003" larger than the maximum expected wire diameter, and the diameter of the passage 112 was selected to be approximately .007" larger than the maximum expected wire diameter.

A radial orifice 114 is provided in the ring unit 104 in communication with the internal passage 112. The orifice 114 is connected to passages 116 and 118 in the ring unit 104 and in the die block mounting member 106 respectively as shown in FIG. 7, and the passage 118 has a fitting 120 positioned in its entrance which is connected by conduit 122 to an air gage control unit shown in FIG. 14. The air gage control unit is connected to a source of air pressure and will be described in detail hereinafter.

The ring unit 104 also has a flange 124 (FIG. 6) to locate it and keep it in the die block mounting member 106, and is further provided with a key-way 126 (FIG. 7) which receives a key 128 to prevent the ring unit 104 from turning in its mounting to interrupt communication between the passages 116 and 118. "O" rings 130 are also provided to seal the unit 104 to the member 106 and to prevent air under pressure from the air gage control unit from escaping except when a defective portion of wire is passing through the ring unit. When defective wire is passing through the ring unit, an escape passage 132 (FIGS. 7 and 14) is formed between the wire cut out 35 and the passage 112. The escape passage 132 thus formed communicates with an outlet passage 134 in the members 106 and 70. The outlet passage 134, as shown in FIG. 6, communicates to atmosphere the space formed between the ring unit 104 and the cut off die 72. It is now apparent that when defective wire is passing through the ring unit 104 it is identified by a decrease in pressure occasioned by an escape passage formed by the orifice 114 and the passages 132 and 134. It should be noted however, that the wire passing through the ring unit 104 must be orientated so that all of the flats or cut outs 35 move past the orifice 114. This is accomplished by the marking device discussed in connection with FIGS. 1–3.

The support structure 58 for the coils or wire being fed to the heading machine 56 is provided with a switch unit 136 which is actuated by the wire during operation to keep the machine energized, but which becomes deactuated when the end of the wire moves past. This stops the machine before the wire runs out.

In FIG. 15 is shown an electric control circuit employed in conjunction with the detection and reject mechanism employed with the heading machine 56. The circuit includes means for energizing and deenergizing the heading machine and means under control of the pressure at the orifice 114 for controlling the discharge chute 102 to direct rollers made from good wire into one container 138, and to direct rollers made from defective wire into another reject container 140 for defective rollers. The control for the chute 102 includes a solenoid operated deflector device 142 (FIG. 11) mounted in a sloping discharge chute 144. The deflector 142 is connected by suitable linkages to a solenoid unit 146 which is controlled by circuit means energized whenever a defective portion of wire is moving through the ring unit 104. The sensing of the defective portions of the wire occurs as a result of a drop in pressure in the air gage control unit as a result of air escaping through the passages 132 and 134 and is occasioned by a cut out 35 being in the ring unit 104. The deflector 142 has a portion 148 which controls the passage 144 and another portion 150 which controls the passage 151 to the reject container 140.

The air gage control mechanism is illustrated in simplified schematic form in FIG. 14. The mechanism includes an air supply conduit 152 which is connected to a filter unit 154 and to a line pressure safety switch assembly PS–1. From there the pressure source is connected through a pressure reducing valve 156 and an adjustable restriction valve 158 to the conduit 122, and to the passages 118, 116 and the orifice 114 in the ring unit 104. An air pressure gage 160 and a reject control switch assembly PS–2 are also connected into the air pressure line which feeds the orifice 114.

In an actual device constructed according to the present invention, the air supply source is maintained at a pressure of approximately 90 pounds per square inch (p.s.i.), and the pressure reducing valve 156 reduces the pressure reaching the valve 158 to approximately 60 p.s.i. The valve 158 further reduces the pressure so that the pressure maintained at the orifice 114 is approximately 35 p.s.i. when wire having no flat or cut out 35 is in the ring unit 104. The line pressure safety switch PS–1 is adjusted to have its contacts in operating position when the inlet pressure is above a predetermined minimum pressure of approximately 65 p.s.i. When the inlet pressure falls below 65 p.s.i. the contacts of the switch PS–1 transfer to the inoperative position and deenergize the machine 56. In FIG. 15 the switch PS–1 is shown in its inoperative position. When the pressure falls below 65 p.s.i. the switch PS–1 also deenergizes the reject gate solenoid 146 thereby opening the chute 151 to the reject container and closing the chute 144 to the container 138.

The pressure switch PS–2 is set to operate when the pressure at the orifice 114 increases above or decreases below approximately 25 p.s.i. When good wire is passing through the ring unit 104 the pressure in the orifice 114 will not be able to escape to any appreciable extent, and therefore the pressure at the orifice 114 will be maintained somewhere above 25 p.s.i. The movable contact of the switch PS–2 will therefore be in a position engaging the upper stationary terminal as shown in FIG. 15 to close an electrical circuit that energizes the gate solenoid 146. When the solenoid 146 is energized the member 142 moves to a position opening chute 144 and closing chute 151.

When, however, a flat or cut out 35 on the wire is passing through the ring unit 104 the pressure in the orifice 114 is substantially dissipated and reduced to below 25 p.s.i. This causes the movable contact of the switch PS–2 to move to the lower stationary terminal (FIG. 15) and to deenergize the circuit of the reject solenoid 146. When the reject solenoid 146 is deenergized the member 142 moves to a position directing rollers to the reject container 140.

It should be noted that the solenoid 146 controls the path of the rollers as they leave the heading machine and is energized when rollers are being made from good wire, and is deenergized when rollers are being made from defective wire.

The electrical circuit associated with the machine and with the air gage control mechanism is shown in the schematic diagram of FIG. 15. The circuit includes a transformer 162 which is connected to a suitable electrical source and also to a plurality of relays, associated relay contacts, switches, solenoids and other electrical devices which are under control of the pressure responsive switches PS–1 and PS–2. The switch PS–1 shown in its inoperative position wherein its movable contact is engaged with the associated lower stationary terminal and the inlet pressure is below 60 p.s.i. The switch PS–2 is also shown in its inoperative position. At this time the low pressure relay CR3 and the low pressure indicator light 164 are energized. The low pressure relay CR3 has normally closed contacts CR3 which open at this time to deenergize the feed roll clutch and prevent wire from entering the machine.

When the inlet pressure exceeds 65 p.s.i. the switch PS–1 moves to its operating position and establishes a plurality of control circuits for energizing the various relays and solenoids associated with the reject and other mechanism.

The electrical circuit also includes a counter device 166 which is identified in the drawing by a dotted outline around the associated structure. The counter 166 is provided to maintain the reject solenoid 146 in its deenergized or reject position after a defect is sensed and until a predetermined number of rollers made after each defect have been rejected. This is done to make sure that all defective rollers go to the reject container 140. The counter device 166 is controlled by normally open relay contacts CR1 and CR2. Relay CR1 is the gate solenoid relay and controls the operation of the gate solenoid 146. Relay CR2 is in a low voltage power supply circuit and is energized each time another length of wire is fed into the machine.

A relay CR4 under control of the switch PS–2 is also provided and it has normally open contacts in the energization circuit of relay CR1.

Another relay CR5 is also provided and is connected to be operated by a set of normally open counter contacts CTR–1. The relay CR5 has normally closed contacts in the hold circuit for the relay CR1 and these contacts are provided to maintain the relay CR1 energized after a defect has passed through the ring unit 104 and until a predetermined number of additional rollers are rejected. The number of additional rejected rollers is determined by the counter 166.

It is also contemplated to provide signal lights in the circuit to indicate when the air pressure supply becomes too low (light 164), when the air gage unit senses a flat 35 or defect in the wire (light 170), and also to indicate when the gate solenoid 146 is deenergized (light 172).

Since all wire fed into the heading machine is cut off and made into rollers or other suitable parts, it is important that every roller containing a defect and/or a flat portion be separated from rollers made from non-defective wire. To insure that this occurs the counter 166 has been provided as already noted to deliberately reject one or more rollers made from that portion of the wire which immediately follows every defect. This includes the portion of the wire between the end of each flat 35 and cut off plane, and also the portion of the wire that has been formed into rollers which are in the exit chute at the time the end of the flats 35 move past the orifice 114. This may even include a short portion of good wire which is deliberately rejected to assure that even an occasional slow moving roller has ample time to pass down the chute 102 and be rejected (see FIG. 3).

The operation of the circuit of FIG. 15 is as follows. When the inlet pressure is above 65 p.s.i. and good wire is being fed into the machine, a circuit is established through switches PS–1 and PS–2 and through the normally closed CR1 contacts to energize the solenoid 146 and to direct the good rollers being made into the container 138. This condition continues until a flat 35 moves to adjacent the orifice 114. When this occurs a reduction in pressure take place which operates the switch PS–2 and transfers its contact thereby deenergizing the solenoid 146. At the same time the switch PS–2 energizes the relay CR4. The contacts of relay CR4 then close to energize the relay CR1 and the signal light 172 associated therewith. With the solenoid 46 deenergized all rollers being made pass into the reject container 140. Thereafter, when the end of the flat is in the ring unit 104, the pressure in the orifice 114 increases to above approximately 25 p.s.i., and this restores the switch PS–2 to its normal operating position. However, with relay CR1 still energized through its own contacts and through the normally closed contacts of the relay CR5, it is not possible to reenergize the solenoid 146. However, with relay CR1 energized, the counter 166 will also be energized through another set of normally open CR1 contacts as soon as the switch PS–2 returns to its operating position. Thereafter the counter is controlled by normally open contacts of the relay CR2, and when a predetermined number of lengths of wire have been fed into the machine the counter contacts CTR–1 will close and energize the relay CR5. The number of lengths of wire is preset in the counter 166 and the counter receives impulses every time relay CR2 is energized. This occurs everytime wire is fed into the machine and causes the pin 78 to strike the stop block 84. Normally closed contacts of the relay CR5 are in the hold circuit of the relay CR1 and open to deenergize the relay CR1 after a predetermined number of feed cycles have taken place. When relay CR1 is deenergized its CR1 contacts close to reenergize the solenoid 146 and again direct rollers into the container 138.

Thus there has been shown and described a novel device for marking wire or the like to indicate the location of defects, and also a novel device for use with the marked wire and controlled by said marks for separating articles made from defective wire from articles made from non-defective wire, which devices fulfill all of the objects and advantages sought therefor. Said devices also includes electrical control means and pressure means associated therewith in the identification and rejection of defective parts.

Many changes, variations, and modifications of the embodiments of the invention selected to be shown and described herein will become apparent to those skilled in the art after considering this specification and the accompanying drawings. All such changes, variations and modifications which do not depart from the spirit and scope of the invention are deemed covered by the invention which is limited only by the claims which follow.

We claim:

1. Means for marking defective wire and the like comprising means for propelling a wire in a predetermined direction, means mounted adjacent to the moving wire for detecting defects therein, said last named means including electromagnetic means generating an electromagnetic field in the wire, said field being affected by defects in the wire as the wire moves past to produce signals in response to said field variations, means responsive to the signals above a predetermined magnitude for cutting a flat surface slice substantially parallel to the longitudinal axis of the wire in locations of the defects, said means for cutting including a cutter member movable to a position in cutting engagement with the wire in response to the signals above said predetermined magnitude, and a backup roller engaging the opposite side of the wire from the cutter member.

2. Means for marking defective wire and the like comprising means for propelling a wire in a predetermined direction, means mounted adjacent to the moving wire for detecting defects therein, said means mounted adjacent including electromagnetic means generating a magnetic field in the wire, said field being affected by defects in the wire as the wire moves past to produce signals in response to said field, and means responsive to the signals above a predetermined magnitude for cutting an elongated flat segment out of the wire substantially parallel to the axis of the wire in areas of the defects, said means for cutting including a cutter member movable to a position in cutting engagement with the wire in response to the signals above said predetermined magnitude.

References Cited

UNITED STATES PATENTS

| | | | |
|---|---|---|---|
| 1,933,351 | 10/1933 | Suits | 324—37 |
| 1,984,465 | 12/1934 | Dana | 324—37 |
| 2,055,672 | 9/1936 | Roop | 324—37 |
| 2,107,926 | 2/1938 | Asmussen | 83—371 X |
| 2,246,906 | 6/1941 | Viebann | 324—37 X |
| 2,309,343 | 1/1943 | Farrow | 83—371 |
| 2,503,476 | 4/1950 | Glover | 90—24 |
| 2,871,940 | 2/1959 | Meunier | 83—371 X |
| 2,915,103 | 12/1959 | Frerichs | 140—71.5 X |

RICHARD J. HERBST, *Primary Examiner.*

G. P. CROSBY, *Assistant Examiner.*